(12) United States Patent
Sade et al.

(10) Patent No.: US 8,468,594 B2
(45) Date of Patent: Jun. 18, 2013

(54) METHODS AND SYSTEMS FOR SOLVING PROBLEMS WITH HARD-CODED CREDENTIALS

(75) Inventors: Yair Sade, Ramat Gan (IL); Roy Adar, Kiryat Ono (IL)

(73) Assignee: Cyber-Ark Software Ltd, Petach Tikva (IL)

( * ) Notice: Subject to any disclaimer, the term of this patent is extended or adjusted under 35 U.S.C. 154(b) by 1106 days.

(21) Appl. No.: 12/029,477

(22) Filed: Feb. 12, 2008

(65) Prior Publication Data

US 2008/0196101 A1    Aug. 14, 2008

Related U.S. Application Data

(60) Provisional application No. 60/889,549, filed on Feb. 13, 2007.

(51) Int. Cl.
*G06F 7/04* (2006.01)

(52) U.S. Cl.
USPC ............ 726/18; 380/46; 726/5; 726/6; 726/7; 726/16; 726/19; 726/20; 713/182; 713/186; 705/72

(58) Field of Classification Search
USPC . 380/46; 726/6, 5, 7, 18, 20, 19, 16; 382/115; 713/182, 186; 705/72
See application file for complete search history.

(56) References Cited

U.S. PATENT DOCUMENTS

| | | | |
|---|---|---|---|
| 6,826,696 B1 * | 11/2004 | Chawla et al. | 726/4 |
| 2004/0158746 A1 | 8/2004 | Hu et al. | |
| 2004/0237071 A1 * | 11/2004 | Hollander et al. | 717/124 |
| 2005/0166261 A1 * | 7/2005 | Kortum et al. | 726/5 |
| 2006/0206930 A1 | 9/2006 | Parashi et al. | |

OTHER PUBLICATIONS

Tom Ritter; Integrating Security Policies via Container Portable Interceptors; Dec. 28, 2005; IEEE; pp. 1-6.*

* cited by examiner

*Primary Examiner* — April Y Blair
(74) *Attorney, Agent, or Firm* — Mark M. Friedman (57) ABSTRACT

The present invention discloses methods, media, and systems for handling hard-coded credentials, the system including: an interception module configured for: intercepting credential usage upon receiving an application request for application credentials in order to provide access to a host application; a configuration/settings module configured for reading system configurations and settings for handling the application credentials; a credential-mapping module configured for: applying appropriate credential-mapping logic based on the system configurations and settings; and upon determining that the application credentials need to be replaced, obtaining appropriate credentials from a secured storage. Preferably, the interception module is further configured for: prior to the intercepting, hooking a connection API of the host application upon access of a credential location in which the application credentials are stored; and wherein the credential-mapping module is further configured for: subsequent to the hooking, using the appropriate credentials to connect the host application with the connection API.

26 Claims, 5 Drawing Sheets

METHODS AND SYSTEMS FOR SOLVING PROBLEMS WITH HARD-CODED CREDENTIALS

This patent application claims priority under 35 U.S.C. §119(e) to U.S. Provisional Application No. 60/889,549, fled Feb. 13, 2007, which is hereby incorporated by reference in its entirety.

FIELD AND BACKGROUND OF THE INVENTION

The present invention relates to methods and systems for solving problems with hard-coded credentials without modifying application source code, related configurations, and/or settings.

Currently, complex computer systems require computer applications to interact with each other. The interaction among applications requires authentication that is usually performed by specifying credentials (e.g. username and password). Such a system typically stores the authentication information (i.e. the credentials) as "hard-coded" text in the source code, related configuration files, and/or settings (e.g. environment variables and registry keys) residing in the system.

As an example, three-tiered application-servers, such as BEA™ WebLogic, IBM™ WebSphere, Oracle™ Application Server (OAS), store database credentials in their configuration files or settings as hard-coded credentials in order to implement database-connection pooling.

Hard-coded credentials are considered a security problem in the field since the storage of such credentials is insecure. Exploitation of hard-coded credentials by unauthorized parties may compromise an entire system's security. Furthermore, hard-coded credentials make it difficult to change the credentials in the host application since changing the credentials would require synchronizing the hard-coded credentials used by the requesting application (i.e. the application requesting authentication) with the new credentials.

There are several methods to mitigate some of the hard-coded credentials security problem.
  (1) Use authentication other than user/password for the credentials (may not be feasible and/or not supported by many applications).
  (2) Obfuscate or encrypt hard-coded credentials.
  (3) Store hard-coded credentials in credential files and protect the files.
  (4) Store hard-coded credentials in a secured storage.

Even when mitigation is suggested for the hard-coded credentials problem, applying the solution to the entire system is a complex and expensive project. Systems can typically include over a million lines of source code. Thus, finding all occurrences of the hard-coded credentials in the source code becomes an extremely difficult task. Locating all occurrences of the hard-coded credentials in the source code manually can be practically infeasible.

In addition, systems may include legacy software that can be hard to change or recompile, or, in some cases, include only the executable code (and are missing the source code). Furthermore, the solutions mentioned above in (1)-(4) do not specifically handle credential-change processes which require synchronization. Synchronization is not a trivial task as all the appearances of the credentials have to be changed with the real credentials at the time that the credentials are needed. The difficulties arise in making the synchronization process totally transparent, without any lag time to the system and/or user. Solving the hard-coded credentials problems, and specifically the credentials-synchronization problems, may require application code changes.

It would be desirable to have methods and systems for solving problems with hard-coded credentials without modifying application source code, related configurations, and/or settings.

SUMMARY OF THE INVENTION

It is the purpose of the present invention to provide methods and systems for solving problems with hard-coded credentials problem without changing the existing source code, related configurations, and/or settings of the system.

For the purpose of clarity, several terms which follow are specifically defined for use herein. The term "application credentials" is used herein to refer to credentials that an application uses in which hard-coded credentials may or may not be included. The term "appropriate credentials" is used herein to refer to credentials that include hard-coded credentials. The term "credential location" is used herein to refer to data in which credentials reside. Examples of credential locations include a location embedded within source code, a configuration file, a system setting, an environment variable, and a registry key.

Embodiments of the present invention teach a novel approach for automatically locating and replacing hard-coded credentials. Embodiments of the present invention eliminate the use of hard-coded credentials without a need to change the system source code, related configurations, and/or settings. Implementation of such methods and systems can reduce operational cost by avoiding more time-intensive methods for solving problems with hard-coded credentials. It is noted that embodiments of the present invention can be implemented as software, hardware, and/or as combination software-hardware modules (e.g. firmware or updatable hardware).

Therefore, according to embodiments described herein, there is provided for the first time a method for handling hard-coded credentials, the method including the steps of: (a) intercepting credential usage upon receiving an application request for application credentials in order to provide access to a host application; (b) reading system configurations and system settings for handling the application credentials; (c) applying appropriate credential-mapping logic based on the system configurations and the system settings; and (d) upon determining that the application credentials need to be replaced, obtaining appropriate credentials from a secured storage.

Preferably, the application credentials reside in a location selected from the group consisting of: a location embedded within source code, a configuration file, the system settings, an environment variable, a registry key, and a credential location.

Preferably, the method further includes the step of: (e) prior to the step of intercepting, hooking a connection API of the host application.

Preferably, the step of intercepting includes intercepting credential usage by a command that uses the application credentials, the method further comprising the steps of: (e) prior to the step of intercepting, upon a host system spawning the command, during initial execution of the command using an API, hooking the API; and (f) subsequent to the step of obtaining, using the appropriate credentials to execute the command.

Preferably, the method further includes the steps of: (e) prior to the step of intercepting, hooking a file-handling API upon access of a configuration file in which the application credentials are stored; and (f) subsequent to the step of hooking, replacing the application credentials, with the appropriate credentials, in the configuration file.

Preferably, the method further includes the steps of: (e) prior to the step of intercepting, hooking a file-handling API upon access of a configuration file in which the application credentials are stored; and (f) subsequent to the step of hooking, using the appropriate credentials in place of the application credentials.

Preferably, the method further includes the steps of: (e) prior to the step of intercepting, hooking a connection API of the host application upon access of a credential location in which the application credentials are stored; and (f) subsequent to the step of hooking, using the appropriate credentials to connect the host application with the connection API.

Preferably, the method further includes the step of: (e) upon the step of intercepting, recording monitoring information and tracing information for providing details on the credential usage.

Preferably, the step of intercepting includes intercepting network packets that include the application credentials.

Preferably, the method further includes the step of: (e) prior to the step of obtaining, ensuring that the appropriate credentials are updated.

According to embodiments described herein, there is provided for the first time a computer-readable storage medium having computer-readable code embodied therein, the computer-readable code including: (a) program code for intercepting credential usage upon receiving an application request for application credentials in order to provide access to a host application; (b) program code for reading system configurations and system settings for handling the application credentials; (c) program code for applying appropriate credential-mapping logic based on the system configurations and the system settings; and (d) program code for, upon determining that the application credentials need to be replaced, obtaining appropriate credentials from a secured storage.

Preferably, the program code for obtaining is operative to obtain the appropriate credentials residing in a location selected from the group consisting of: a location embedded within source code, a configuration file, the system settings, an environment variable, a registry key, and a credential location.

Preferably, the computer-readable code further includes: (e) program code for, prior to the intercepting, hooking a connection API of the host application.

Preferably, the program code for intercepting is operative to intercept credential usage by a command that uses the application credentials, the computer-readable code further comprising: (e) program code for, prior to the intercepting, upon a host system spawning the command, during initial execution of the command using an API, hooking the API; and (f) program code for, subsequent to the obtaining, using the appropriate credentials to execute the command.

Preferably, the computer-readable code further includes: (e) program code for, prior to the intercepting, hooking a file-handling API upon access of a configuration file in which the application credentials are stored; and (f) program code for, subsequent to the hooking, replacing the application credentials, with the appropriate credentials, in the configuration file.

Preferably, the computer-readable code further includes: (e) program code for, prior to the intercepting, hooking a file-handling API upon access of a configuration file in which the application credentials are stored; and (f) program code for, subsequent to the hooking, using the appropriate credentials in place of the application credentials.

Preferably, the computer-readable code further includes: (e) program code for, prior to the intercepting, hooking a connection API of the host application upon access of a credential location in which the application credentials are stored; and (f) program code for, subsequent to the hooking, using the appropriate credentials to connect the host application with the connection API.

Preferably, the computer-readable code further includes: (e) program code for, upon the intercepting, recording monitoring information and tracing information for providing details on the credential usage.

Preferably, the program code for intercepting is operative to intercept network packets that include the application credentials.

Preferably, the computer-readable code further includes: (e) program code for, prior to the obtaining, ensuring that the appropriate credentials are updated.

According to embodiments described herein, there is provided for the first time a system for handling hard-coded credentials, the system including: (a) an interception module configured for: (i) intercepting credential usage upon receiving an application request for application credentials in order to provide access to a host application; (b) a configuration/settings module configured for reading system configurations and system settings for handling the application credentials; (c) a credential-mapping module configured for: (i) applying appropriate credential-mapping logic based on the system configurations and the system settings; and (ii) upon determining that the application credentials need to be replaced, obtaining appropriate credentials from a secured storage.

Preferably, the obtaining includes obtaining the appropriate credentials residing in a location selected from the group consisting of: a location embedded within source code, a configuration file, the system settings, an environment variable, a registry key, and a credential location.

Preferably, the interception module is further configured for: (ii) prior to the intercepting, hooking a connection API of the host application.

Preferably, the intercepting includes intercepting credential usage by a command that uses the application credentials, wherein the interception module is further configured for: (ii) prior to the intercepting, upon a host system spawning the command, during initial execution of the command using an API, hooking the API; and wherein the credential-mapping module is further configured for: (iii) subsequent to the obtaining, using the appropriate credentials to execute the command.

Preferably, the interception module is further configured for: (ii) prior to the intercepting, hooking a file-handling API upon access of a configuration file in which the application credentials are stored; and wherein the credential-mapping module is further configured for: (iii) subsequent to the hooking, replacing the application credentials, with the appropriate credentials, in the configuration file.

Preferably, the interception module is further configured for: (ii) prior to the intercepting, hooking a file-handling API upon access of a configuration file in which the application credentials are stored; and wherein the credential-mapping module is further configured for: (iii) subsequent to the hooking, using the appropriate credentials in place of the application credentials.

Preferably, the interception module is further configured for: (ii) prior to the intercepting, hooking a connection API of the host application upon access of a credential location in which the application credentials are stored; and wherein the credential-mapping module is further configured for: (iii) subsequent to the hooking, using the appropriate credentials to connect the host application with the connection API.

Preferably, the credential-mapping module is further configured for: (iii) upon the intercepting, recording monitoring information and tracing information for providing details on the credential usage.

Preferably, the intercepting includes intercepting network packets that include the application credentials.

Preferably, the system further includes: (d) a synchronization module configured for, prior to the obtaining, ensuring that the appropriate credentials are updated.

Preferably, the interception module, the configuration/settings module, and the credential-mapping module are each configured as a combination of software and hardware modules.

Preferably, the interception module, the configuration/settings module, and the credential-mapping module are each configured as an updatable hardware module.

Preferably, the system is configured as a computer server.

These and further embodiments will be apparent from the detailed description and examples that follow.

BRIEF DESCRIPTION OF THE DRAWINGS

The present invention is herein described, by way of example only, with reference to the accompanying drawings, wherein.

DESCRIPTION OF THE PREFERRED EMBODIMENTS

The present invention relates to methods and systems for solving problems with hard-coded credentials. The principles and operation for solving problems with hard-coded credentials, according to the present invention, may be better understood with reference to the accompanying description and the drawings.

Figure 1:
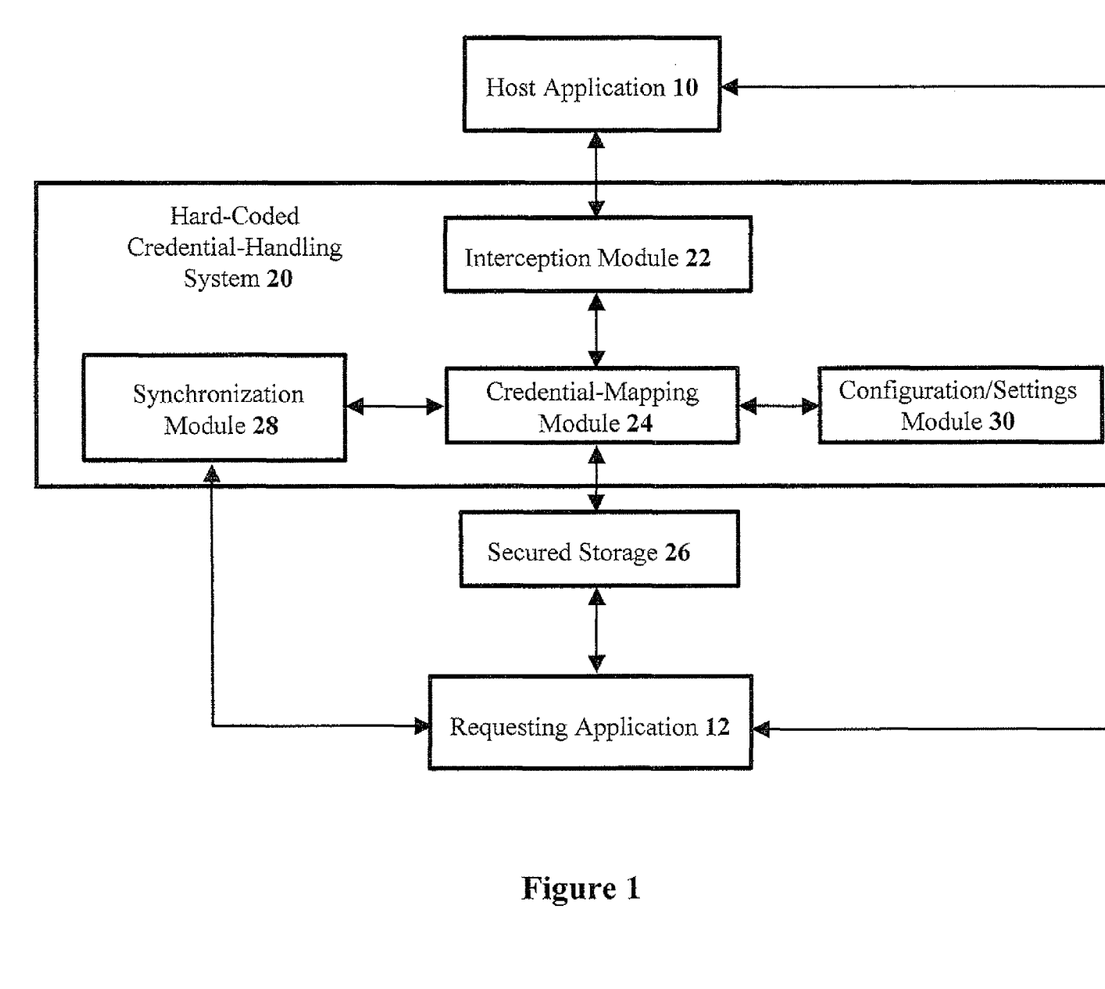
FIG. 1 is a simplified schematic block diagram of hard-coded credential-handling system, according to preferred embodiments of the present invention.

Referring now to the drawings, FIG. 1 is a simplified schematic block diagram of an exemplary hard-coded credential-handling system, according to preferred embodiments of the present invention. The example shown in FIG. 1 enables a host application 10 to provide proper credentials to a requesting application 12. A hard-coded credential-handling system 20 is shown, which is based partly on transparently replacing the original application-authentication operation, which includes the hard-coded credentials, with an interception module 22.

Interception module 22 calls a credential-mapping module 24 that provides requesting application 12 with the credentials that are obtained dynamically from a secured storage 26. Credential-mapping module 24 interacts with a synchronization module 28, and uses a configuration/settings module 30 in order to apply the necessary logic for providing credentials from secured storage 26. When credentials are changed, synchronization module 28 is ensures that credential-mapping module 24 always provides correct and updated credentials to requesting application 12.

Interception module 22 can perform its task using various methods (e.g. hooking an Application-Programming-Interface (API), monitoring and intercepting network-packets, altering byte-code, altering operating-system drivers, or changing the configuration).

API hooking refers to methods that include: (1) intercepting calls to APIs, and (2) modifying existing API behavior. API hooking is typically performed externally to an application, without the need to modify the application code that uses the associated API. API-hooking methods are available for all of the popular operating systems. There are several ways of exploiting API-hooking techniques for solving problems with hard-coded credentials.

When applications interact with each other, the applications may send their hard-coded credentials to a module, component, or API that performs the application-to-application authentication. In embodiments of the present invention, the application-to-application-authentication is intercepted by interception module 22, and the hard-coded credentials are replaced with credentials that are retrieved from secured storage 26.

Network-packet interception is a method that monitors network traffic, detects credentials in the network packets, replaces the hard-coded credentials with credentials obtained from secured storage 26 (if needed), and redirects the modified packets to the destination application. Interception module 22 serves as an intermediary between the two applications (i.e. host application 10 and requesting application 12) that communicate with each other over the network.

Interception module 22 can be implemented differently, depending on the system. For example, in systems that use byte-code (e.g. JAVA or .NET applications), it is possible to intercept the byte-code, check for requests to authentication functions that may use hard-coded credentials, and replace such requests with ones that first obtain the credentials from secured storage 26.

In some systems (e.g. systems in which operating-system drivers and libraries are used to perform authentication), interception module 22 for such drivers and/or libraries can be implemented by replacing the drivers/libraries with supplied alternatives that solve the problem with hard-coded credentials. Substitution of the credentials is accomplished by having the replaced components initially obtain the credentials from secured storage 26 before proceeding to perform the intended task of the replaced component.

There are other systems (such as three-tiered application-servers) that the hard-coded credentials can be written in configuration files or settings. For such a system, interception module 22 can be implemented as a hook in the authentication process, for example. Interception module 22 will replace the hard-coded credentials written in the configuration files with credentials taken from secured storage 26. Such a method renders the hard-coded credentials written in the configuration files irrelevant, and solves the hard-coded credential problem for such a system.

In the section above, several interception approaches can be implemented to meet the constraints of particular systems. The common feature of all the examples is that the present invention solves the problem with hard-coded credentials transparently without the need to re-code the applications. The fact that the credentials that the applications use are no longer hard-coded, and instead are retrieved by hard-coded credential-handling system 20, makes credential-updating procedures (e.g. password updating) possible, since the credentials that requesting application 12 uses are always synchronized by synchronization module 28.

It is noted that embodiments of the present invention can be implemented as software, hardware, and/or as combination software-hardware modules (e.g. firmware). Hard-coded credential-handling system 20 (and/or its modules) shown in FIG. 1 can be installed and executed on a server (not shown), or embedded into integrated components (not shown), for example.

Figure 2:
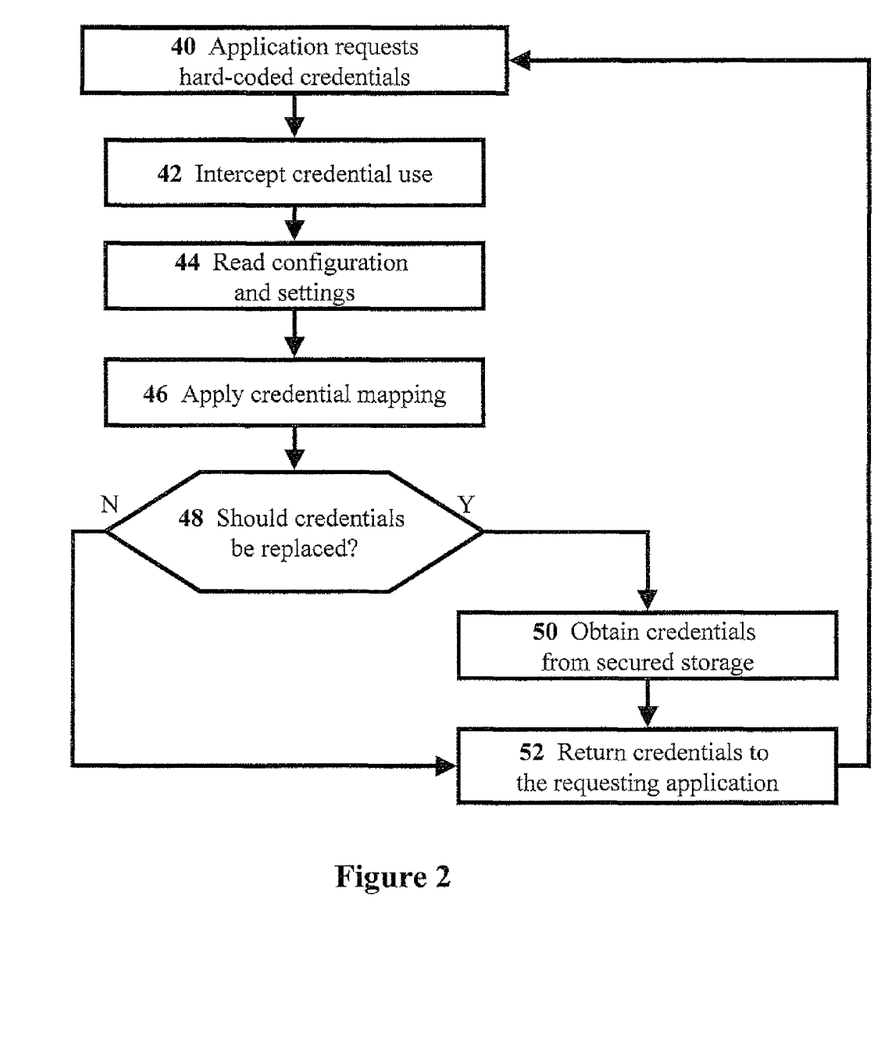
FIG. 2 is a simplified flowchart of the major process steps in a hard-coded credential-handling system, according to preferred embodiments of the present invention.

FIG. 2 is a simplified flowchart of the major process steps in a hard-coded credential-handling system, according to preferred embodiments of the present invention. When requesting application 12 requests to use hard-coded credentials from host application 10 (Step 40) (e.g. calling an API for authentication), credential-handling system 20 intercepts the credential use via interception module 22 (Step 42). At this point, credential-mapping module 24 is given control. First, credential-mapping module 24 reads the system configuration and settings from configuration/settings module 30 (Step 44), and then applies the appropriate credential-mapping logic (Step 46).

Credential-mapping module 24 then decides whether the system should replace the credentials based on whether the credentials are handled by the system (Step 48). For credentials that need to be replaced, credential-mapping module 24 obtains the credentials from secured storage 26 (Step 50), replaces the original credentials, and returns the replaced credentials to requesting application 12 (Step 52). In the case that the credentials are not handled by the system, credential-mapping module 24 simply returns the unchanged credentials to requesting application 12 (Step 52). According to the process described above, hard-coded credentials can be eliminated transparently, and replaced by credentials from secured storage 26 without the need to recode the application.

Figure 3:
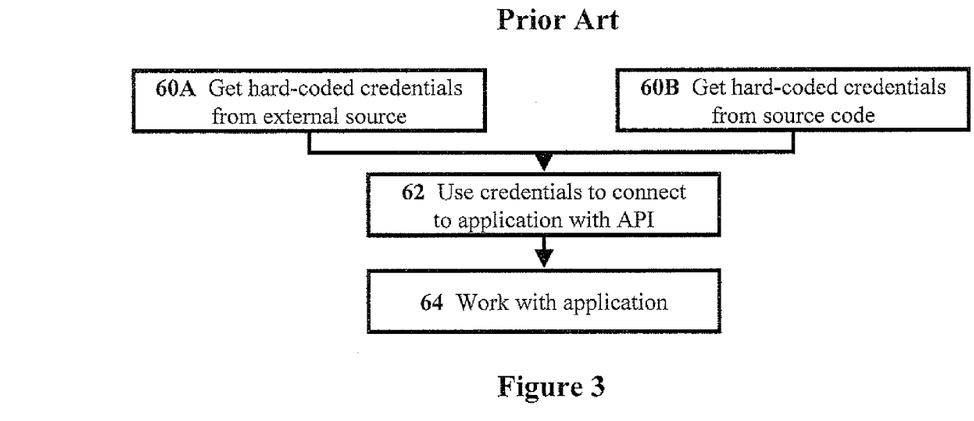
FIG. 3 is a simplified flowchart of the major process steps in using embedded credentials and hard-coded credentials in external sources to connect to databases and applications, according to the prior art.

FIG. 3 is a simplified flowchart of the major process steps in using embedded credentials and hard-coded credentials in external sources to connect to databases and applications, according to the prior art. The process starts with obtaining hard-coded credentials from either an external source (Step 60A) or source code (Step 60B). Such external sources include configuration files, for example. The system uses the credentials to connect to host application 10 with an API (Step 62). Then, work can be performed using host application 10 (Step 64). FIG. 3 represents a general approach to a process that uses hard-coded credentials. The problems that arise due to the hard-coded credentials can be transparently solved by preferred embodiments of the present invention without the need to recode the application; examples of specific implementations are detailed in the schemes of FIGS. 4-6.

Figure 4:
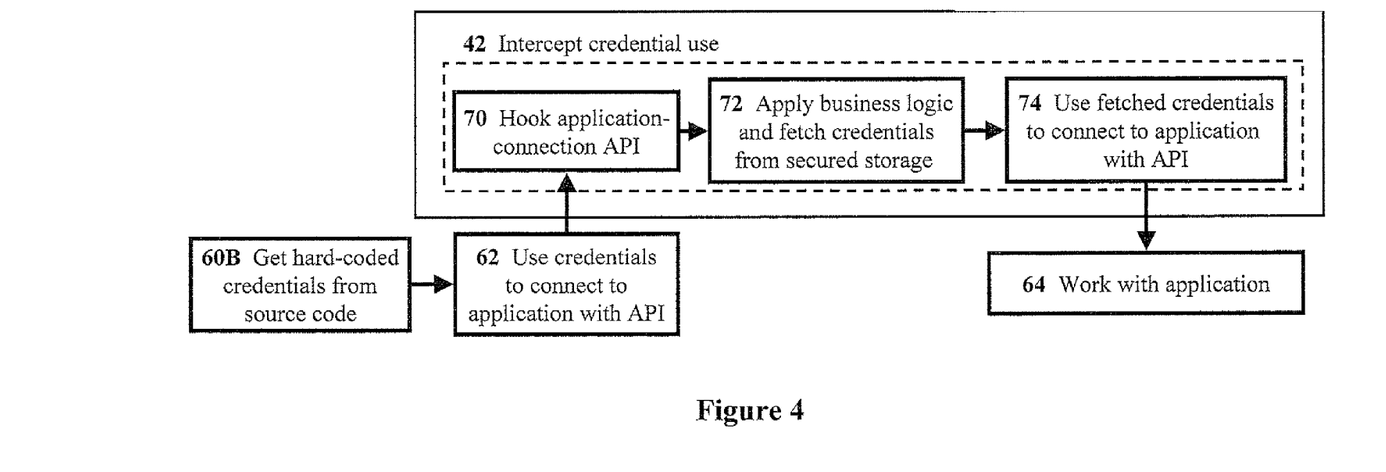
FIG. 4 is a simplified scheme of the major process steps in using API hooking to replace hard-coded credentials, according to preferred embodiments of the present invention.

FIG. 4 is a simplified scheme of the major process steps in using API hooking to replace hard-coded credentials, according to preferred embodiments of the present invention. The process starts with obtaining hard-coded credentials from source code (Step 60B from FIG. 3). The system uses the credentials to connect to host application 10 with an API (Step 62). At this point, the connection API of host application 10 is hooked (Step 70), and the interception module 22 of credential-handling system 20 (FIG. 1) intercepts the credential use (as generally described by Step 42 of FIG. 2).

The system applies the appropriate "business logic", and fetches the appropriate credentials from secured storage 26 using credential-mapping module 24 (Step 72). The fetched credentials are then used to connect to host application 10 with the API (Step 74). Then, work can be performed using host application 10 (Step 64).

The scheme shown in FIG. 4 (as well as the schemes of FIGS. 5 and 6) is meant to emphasize the steps that are performed by credential-handling system 20 (i.e. the steps in the box marked as Step 42 in FIG. 4) as opposed to the steps handled by the original code (i.e. Steps 60B, 62, and 64).

Figure 5:
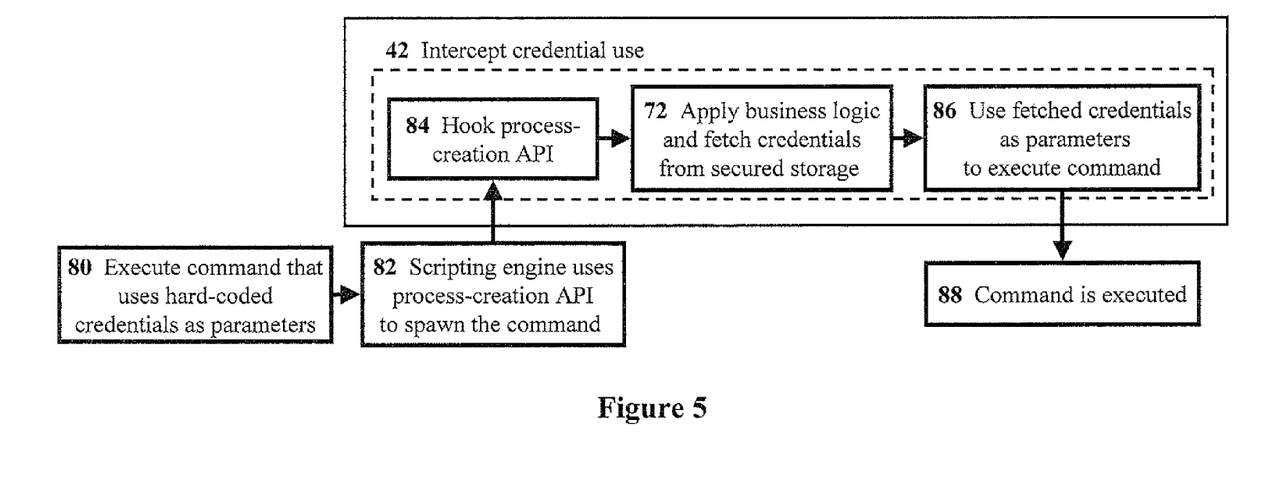
FIG. 5 is a simplified scheme of the major process steps in hooking process-creation APIs to replace hard-coded credentials in scripts, according to preferred embodiments of the present invention.

FIG. 5 is a simplified scheme of the major process steps in hooking process-creation APIs to replace hard-coded credentials in scripts, according to preferred embodiments of the present invention. The process starts when a command is executed that uses hard-coded credentials as parameters (Step 80). The command is "spawned" (i.e. processed) by a scripting engine, of the host system, using a process-creation API (Step 82). The process-creation API is hooked (Step 84), and credential use is then intercepted (Step 42).

The system applies the appropriate business logic, and fetches the appropriate credentials from secured storage 26 using credential-mapping module 24 (Step 72). The fetched credentials are then used as parameters to execute the command (Step 86), and the command is executed (Step 88). In the scheme of FIG. 5, Steps 84, 72, and 86 are performed by credential-handling system 20.

Host applications such as Unix shell scripts, for example, can be hooked using the scheme of FIG. 5. For example, Unix shell scripts invoke backup software, and include the backup-software credentials hard-coded within the script. Another example of API hooking using the scheme of FIG. 5 is hooking a NET USE command on the Microsoft™ Windows™ operating system. A NET USE command allows scripts to connect to the Windows network. The command utilizes credentials as parameters. When a script sends hard-coded credentials to the NET USE command in order to connect to the network, the process-creation API, which is invoked when calling a command, is hooked, and the credentials, sent by the application, are replaced by credentials from storage. This provides a solution for hard-coded credentials in a script without a need to modify the script.

As another example of a specific implementation, embodiments of the present invention can be employed to hook an open-DB-connectivity (ODBC) API. ODBC API is a standard API that allows database access on systems running the Windows operating system. In order to connect to the DB, the applications use the structured-query language (SQL) API function called SQLConnect, which utilizes credentials as parameters. In the preferred embodiment, the SQLConnect command is hooked, and the credential parameters are replaced with credentials that are retrieved from a secured storage, such as the Digital Vault available from Cyber-Ark Software Ltd., Petah Tikvah, Israel.

When applications send hard-coded credentials to the SQLConnect function, the hooked function will replace the credentials that the application originally sent with credentials that are extracted from the secured storage. The problem with the hard-coded credentials for the application can therefore be solved without the need to change and synchronize the hard-coded credentials stored by the application.

Figure 6:
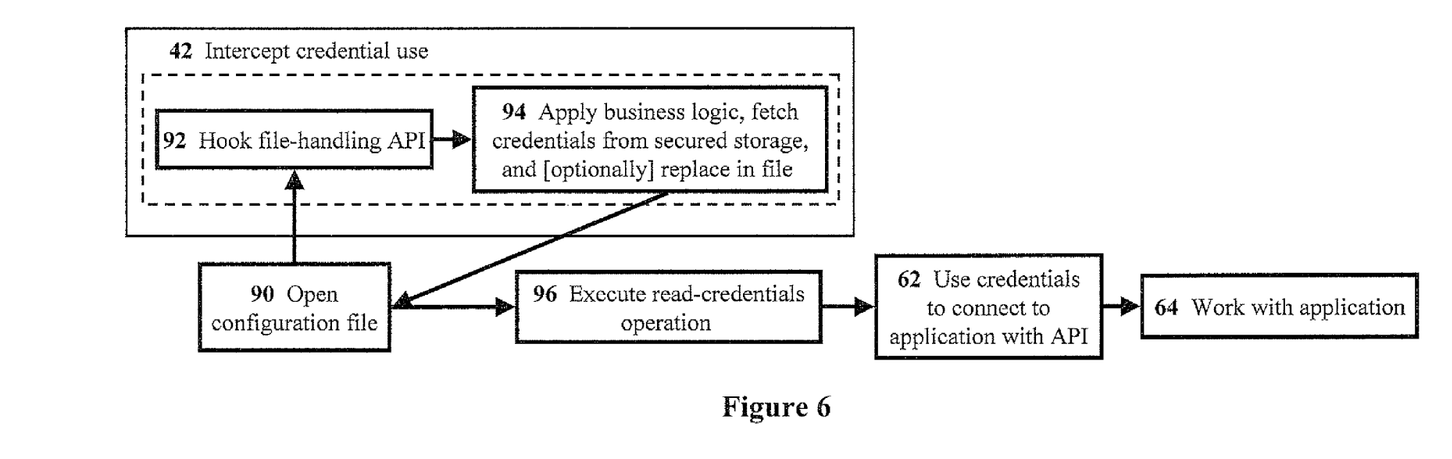
FIG. 6 is a simplified scheme of the major process steps in using API hooking to replace hard-coded credentials in configuration files, according to preferred embodiments of the present invention.

FIG. 6 is a simplified scheme of the major process steps in using API hooking to replace hard-coded credentials in configuration files, according to preferred embodiments of the present invention. The process starts when a configuration file in which the credentials are stored is accessed by host application 10 (Step 90). The file-handling API (e.g. "file open" or "file read") is hooked (Step 92), and the credential use is then intercepted (Step 42).

The system then applies the appropriate business logic, fetches the appropriate credentials from secured storage 26 using credential-mapping module 24, and optionally replaces the credentials in the configuration file with the fetched credentials (Step 94). The read-credentials operation is then executed (Step 96). The operation is performed either by reading the fetched credentials from the configuration file, or by hooking the file-read API. The system uses the credentials to connect to host application 10 with an API (Step 62), and then work can be performed using host application 10 (Step 64).

In the scheme of FIG. 6, Steps 92 and 94 are performed by credential-handling system 20. By hooking the file-handling APIs, the use of hard-coded credentials can be traced in such systems, and replaced with appropriate credentials. Hooking the file-handling API guarantees that when requesting application 12 reads credentials from the configuration file, requesting application 12 always gets the appropriate (i.e. fetched) credentials. Such a process can be performed due to the hooking of the API with or without actually replacing the credentials in the configuration file itself.

Figure 7:
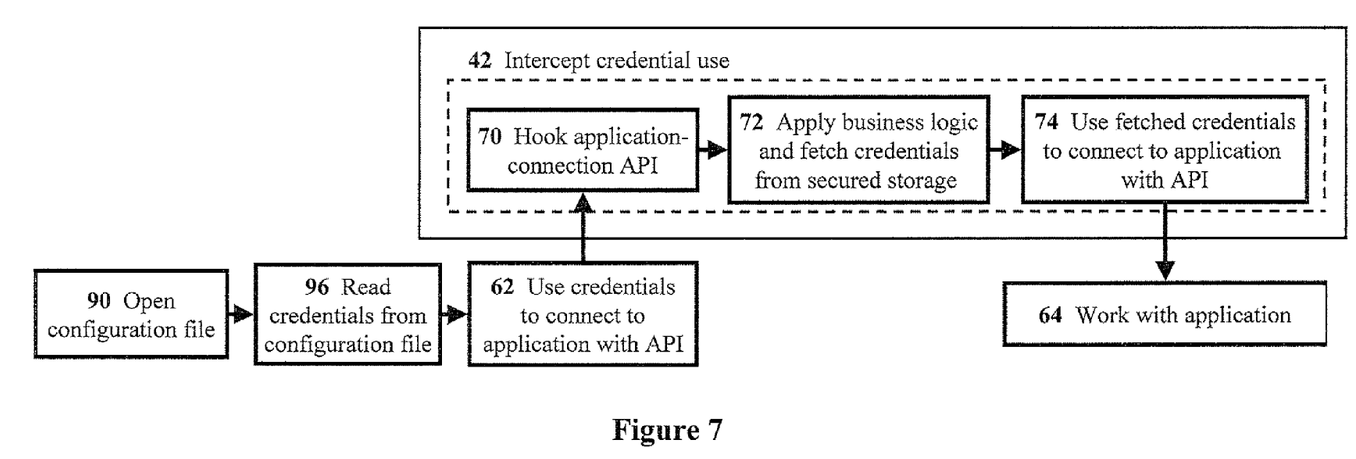
FIG. 7 is a simplified scheme of the major process steps in using API hooking of the authentication function to render hard-coded credentials in configuration files irrelevant, according to preferred embodiments of the present invention.

FIG. 7 is a simplified scheme of the major process steps in using API hooking of the authentication function to render hard-coded credentials in configuration files irrelevant, according to preferred embodiments of the present invention. The process starts when a configuration file in which the credentials are stored is accessed by host application 10 (Step 90). The credentials are then read from the configuration file (Step 96). The system uses the credentials to connect to host application 10 with an API (Step 62). Then, the connection API of host application 10 is hooked as in the scheme of FIG. 4 (Step 70). Such an approach is well-suited for transparently solving problems with hard-coded credentials in three-tier application servers.

The system applies the appropriate business logic, and fetches the appropriate credentials from secured storage 26 using credential-mapping module 24 (Step 72). The fetched credentials are then used to connect to host application 10 with the API (Step 74). Then, work can be performed using host application 10 (Step 64).

Figure 8:
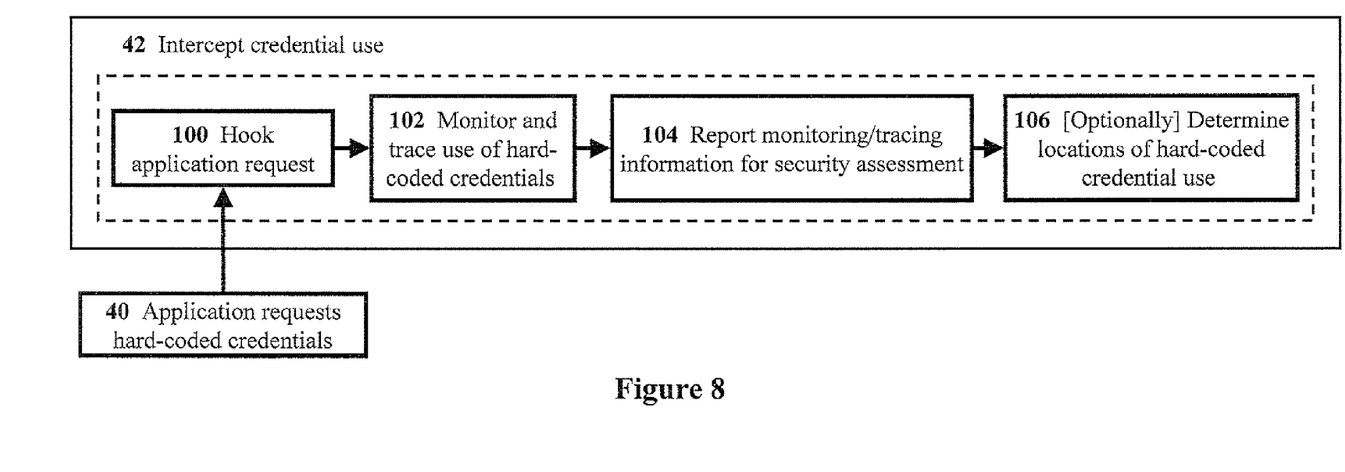
FIG. 8 is a simplified scheme of the major process steps in using API hooking to monitor and trace hard-coded credential usage, according to preferred embodiments of the present invention.

There are systems in which dynamic replacement of credentials is not a feasible solution. FIG. 8 is a simplified scheme of the major process steps in using API hooking to monitor and trace hard-coded credential usage, according to preferred embodiments of the present invention. When an application requests to use hard-coded credentials (Step 40), the request is intercepted by interception module 22 (Step 42), and hooked via credential-mapping module 24 (Step 100). Credential-mapping module 24 can record monitoring and tracing information, providing details on the use of the hard-coded credentials (instead of dynamically replacing them) (Step 102).

Such monitoring/tracing information can be reported in order to help in security assessment of such systems (Step 104). Additionally, the monitoring/tracing information can be used to determine the exact locations that hard-coded credentials are being used in order to assist developers in manually correcting the problematic credential locations (Step 106).

While the invention has been described with respect to a limited number of embodiments, it will be appreciated that many variations, modifications, and other applications of the invention may be made.

What is claimed is:

1. A method for eliminating security risks emanating from hard-coded application credentials used in application-to-application authentication, comprising: (a) intercepting hard-coded application credentials used in application-to application-authentication; (b) applying credential-mapping logic to map the hard-coded application credentials with replacement application credentials from secured storage; and
   (c) supplying said replacement application credentials to be used in the application-to-application authentication instead of the hard-coded application credentials so as to render the hard-coded application credentials non-functional as application credentials, thereby eliminating security risks emanating from the hard-coded application credentials, the method of steps is performed by a computer system.

2. The method of claim 1, wherein the step of intercepting hard-coded application credentials includes hooking a connection API of a host application used in the application-to-application authentication.

3. The method of claim 1, wherein the step of intercepting hard-coded application credentials includes hooking at least one API associated with execution of a command.

4. The method of claim 1, wherein the step of intercepting hard-coded application credentials includes hooking file-handling API of a file containing the hard-coded application credentials.

5. The method of claim 1 further comprising a step of:
   (d) recording information regarding hard-coded application credential usage.

6. The method of claim 1, wherein the step of intercepting hard-coded application credentials includes intercepting network packets that include the hard-coded application credentials.

7. The method of claim 1, further comprising a step of:
   (d) synchronizing said replacement application credentials with a host application used in the application-to application authentication.

8. The method of claim 1, further comprising a step of determining a need to replace the hard-coded application credentials based on system configurations or system settings.

9. A non-transitory, computer-readable storage medium comprising a computer-readable program code embodied therein, said program code configured to cause a computer that executes said program code to:
   (a) intercept hard-coded application credentials used in application-to application authentication;
   (b) map the hard-coded application credentials with replacement application credentials from secured storage; and
   (c) supply said replacement application credentials to be used in the application-to-application authentication instead of the hard-coded application credentials so as to render the hard-coded application credentials non-functional as application credentials, thereby eliminating security risks emanating from the hard-coded application credentials.

10. The non-transitory, computer-readable storage medium of claim 9, wherein said program code configured to cause a computer that executes said program code to intercept hard-coded application credentials includes program code to hook a connection API of a host application used in the application-to-application authentication.

11. The non-transitory, computer-readable storage medium of claim 9, wherein said program code configured to cause a computer that executes said program code to intercept hard-coded application credentials includes program code to hook at least one API associated with execution of a command.

12. The non-transitory, computer-readable storage medium of claim 9, wherein said program code configured to cause a computer that executes said program code to intercept hard-coded application credentials includes program code to hook a file-handling API associated with at least one file containing the hard-coded application credentials.

13. The non-transitory, computer-readable storage medium of claim 9, further comprising program code configured to record information regarding said hard-coded application credential usage.

14. The non-transitory, computer-readable storage medium of claim 9, further comprising program code configured to intercept network packets that include said hard-coded application credentials.

15. The non-transitory, computer-readable storage medium of claim 9, further comprising program code configured to synchronize said replacement application credentials with a host application used in the application-to application authentication.

16. The non-transitory, computer-readable storage medium of claim 9, further comprising program code to determine a need to replace the hard-coded application credentials based on system configurations or system settings.

17. A computer system comprising:
a hardware processor;
said hardware processor configured to:
  intercept hard-coded application credentials used in application-to-to application authentication;
  apply credential-mapping logic to map the hard-coded application credentials with replacement application credentials from secured storage; and c) supply said replacement application credentials to be used in the application-to-application authentication so as to render the hard-coded application credentials non-functional as application credentials, thereby eliminating security risks emanating from the hard-coded application credentials.

18. The computer system of claim 17, wherein said hardware processor further configured to intercept hard-coded application credentials using a method of hooking a connection API of a host application used in the application-to-application authentication.

19. The computer system of claim 17, wherein said hardware processor further configured to intercept hard-coded application credentials using a method of hooking at least one API associated with execution of a command.

20. The computer system of claim 17, wherein said hardware processor further configured to intercept hard-coded application credentials using a method of hooking a file-handling API associated with at least one file containing the hard-coded application credentials.

21. The computer system of claim 17, wherein said hardware processor further configured to record information regarding said hard-coded application credential usage.

22. The computer system of claim 17, wherein said hardware processor configured to intercept hard-coded application credentials using a method of intercepting network packets containing said hard-coded application credentials.

23. The computer system of claim 17, wherein said hardware processor further configured to synchronize said replacement application credentials with a host application used in the application-to-application authentication.

24. The computer system of claim 17, wherein the computer system is configured by way of either, hardware, or a combination of software and hardware.

25. The computer system of claim 24, wherein said hardware includes updatable hardware.

26. The computer system of claim 17, wherein said hardware processor further configured to determine a need for replacing the hard-coded application credentials based on system configuration or system settings.

* * * * *